United States Patent [19]
Sakamoto et al.

[11] Patent Number: 6,124,770
[45] Date of Patent: Sep. 26, 2000

[54] EXPANDABLE RESIN COMPOSITION

[75] Inventors: Toshio Sakamoto, Kanagawa; Koji Ishihara, Tokyo; Takashi Furukawa, Kanagawa, all of Japan

[73] Assignee: Nippon Unicar Company Limited, Tokyo, Japan

[21] Appl. No.: 09/425,357

[22] Filed: Oct. 22, 1999

[51] Int. Cl.⁷ .............................. H01P 3/00; B32B 9/00; C08J 9/12
[52] U.S. Cl. ................. 333/242; 428/304.4; 428/391; 521/81; 521/94; 521/134; 521/154
[58] Field of Search .................. 333/242; 428/304.4, 428/391; 521/134, 81, 154, 94

[56] References Cited

U.S. PATENT DOCUMENTS 4,189,619  2/1980  Pedlow ............................ 521/85
4,333,898  6/1982  Schmidtchen ..................... 521/134

FOREIGN PATENT DOCUMENTS 213133  of 1997  Japan .
 52983  of 1997  Japan .

*Primary Examiner*—Morton Foelak
*Attorney, Agent, or Firm*—Saul R. Bresch

[57] ABSTRACT

An expandable resin composition comprising
- (A) HDPE (high density polyethylene);
- (B) a high pressure, low density homopolymer of ethylene (HP-LDPE);
- (C) polypropylene;
- (D) a polysiloxane-polyether block copolymer; and
- (E) a nucleating agent of azodicarbonamide and/or talc.

4 Claims, No Drawings

EXPANDABLE RESIN COMPOSITION

TECHNICAL FIELD

This invention relates to (i) an expandable resin composition and (ii) a cable containing an expanded layer of the composition.

BACKGROUND INFORMATION

In the technology of insulated wires, especially coaxial cables for high-frequency signal transmission, improvements by way of enhancing the expansion of cellular (or foamed) insulation are desirable in order to decrease leakage attenuation and clarify image and sound.

A typical cable is constructed of metal conductors insulated with a polymeric material. These insulated conductors are generally twisted to form a core and are protected by another polymeric sheath or jacket material. In certain cases, added protection is afforded by inserting a wrap between the core and the sheath. In fiber optics cable, glass fibers are used instead of metal conductors, but a protective sheath is still necessary. A typical coaxial cable is comprised of an inner conductor, typically copper or copper clad steel or aluminum; a dielectric insulation layer; and an outer conductor, for example, aluminum foil with aluminum or copper braid or tube.

The general practice for producing cable insulated with expanded cellular (or foamed) coatings is to use an expansion or blowing process, which relies on chemical or gaseous blowing agents.

A chemical blowing process comprises the following steps: a chemical blowing agent is blended with a resin component at a temperature below the decomposition temperature of the blowing agent; the blended material is fed to an extruder for coating onto a conductor at a temperature above the decomposition temperature of the blowing agent; and the coated layer is subsequently allowed to expand in air and solidify using a coolant such as water. Chemical blowing processes are prevalent to a certain extent because the required investment is lower and the operation is simpler than gas blowing processes in spite of the smaller expansion and lower mechanical strength than is the case with gas blowing processes.

The extent of expansion by a chemical blowing process is, at most, 70 percent by volume. In addition, current processes use high pressure low density polyethylene (HP-LDPE). The expanded products of these processes do not have enough mechanical strength and are unsatisfactory for producing coaxial cables of high quality.

On the other hand, gas blowing processes use, in place of a chemical blowing agent, a chlorofluorocarbon gas such as monofluorotrichlormethane, difluorodichloromethane, trifluorotrichloroethane, and tetrafluorodichloroethane to easily obtain highly expanded products of 80 percent (by volume) expansion or more. Since these processes utilize high density polyethylene, enough mechanical strength is provided to produce coaxial cables of high quality. Chlorofluorocarbon gases, however, because of their negative effect on the ozone layer, are being phased out. Inert gases such as nitrogen, argon, and carbon dioxide have been proposed as alternatives to the chlorofluorocarbon gases. Attempts to substitute nitrogen for the chlorofluorocarbons, however, have resulted in high density expanded products, which do not have a uniform and fine cell structure. These expanded products are not commercially satisfactory.

It is also found that low density homopolymers of ethylene made by a high pressure process provide mechanical strength inferior to high density polyethylene, and require expensive L type extruders to enhance dispersability.

DISCLOSURE OF THE INVENTION

An object of this invention, therefore, is to provide a low density expandable resin composition and a cable containing an expanded layer of said composition utilizing an inert gas blowing agent wherein the expanded layer is characterized by an expansion of at least about 70 percent by volume; a uniform and fine cell structure; and excellent mechanical strength, and, further, a composition, which can be easily dispersed with a low cost single screw extruder as opposed to the expensive L type extruder.

According to the present invention, the object is met by the following expandable resin composition.

The composition comprises:

(A) 100 parts by weight of HDPE (high density polyethylene) having a DSC melting point of about 130 to about 136 degrees C.; a density of 0.945 to 0.968 gram per cubic centimeter; and a melt flow rate of about 0.1 to about 25 grams per 10 minutes, and for each 100 parts by weight of component (A), (B) about 20 to about 150 parts by weight of a high pressure, low density homopolymer of ethylene (HP-LDPE) having long chain branching; a density of 0.915 to 0.925 gram per cubic centimeter; and a melt flow rate of 0.1 to 10 grams per 10 minutes;

(C) about 1 to about 50 parts by weight of polypropylene having a DSC melting point of at least about 130 degrees C.;

(D) about 0.1 to about 5 parts by weight of a polysiloxane-polyether block copolymer having the following formula:

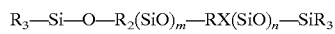

$$R_3-Si-O-R_2(SiO)_m-RX(SiO)_n-SiR_3$$

wherein each R is independently a monovalent alkyl, alkoxy, hydroxy, aryl, or aralkyl group;
X has the formula:

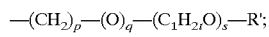

$$-(CH_2)_p-(O)_q-(C_1H_{2t}O)_s-R';$$

R' is the same as R above and $-(C_tH_{2t}O)_s-$ is a radical group of ethylene oxide or propylene oxide polymer; and
m is 5 to 300; n is 2 to 20; p is 0 or 2; q is 0 or 1; t is 2 or 3; and s is 5 to 100; and (E) about 0.02 to about 5 parts by weight of a nucleating agent selected from the group consisting of azodicarbonamide, talc, and mixtures thereof.

DESCRIPTION OF THE PREFERRED EMBODIMENT(S)

Component (A) is a conventional high density polyethylene (HDPE) having a DSC melting point of about 130 to about 136 degrees C.; a density of 0.945 to 0.968 gram per cubic centimeter; and a melt flow rate of about 0.1 to about 25 grams per 10 minutes. The DSC melting point is the melting point determined under JIS (Japanese Industrial Standard) K 7121 by measuring the latent heat of fusion by using a differential scanning calorimeter (DSC). Density is determined under JIS K 7112. The high density polyethylene can be a homopolymer or a copolymer of ethylene and propylene, 1-butene, 1-hexene, 4-methyl-1-pentene, or 1-octene, and can be produced using a chromium based catalyst system, a magnesium-titanium based catalyst system, a vanadium based catalyst system, a single site metallocene based catalyst system, or other transition metal based catalyst systems.

Component (B) is a high pressure, low density homopolymer of ethylene (HP-LDPE) having long chain branching; a density of 0.915 to 0.925 gram per cubic centimeter; and a melt flow rate of 0.1 to 10 grams per 10 minutes. HP-LDPE having these properties reduces foaming gas leakage in the foaming gas temperature range of about 140 to about 230 degrees C. because of its high melt tension. The HP-LDPE can be prepared using a conventional high pressure process which is described in Introduction to Polymer Chemistry, Stille, Wiley and Sons, New York, 1962, pages 149 to 151. The high pressure processes are typically free radical initiated polymerizations conducted in a tubular reactor or a stirred autoclave. In the stirred autoclave, the pressure is in the range of about 10,000 to 30,000 psi and the temperature is in the range of about 175 to about 250° C., and in the tubular reactor, the pressure is in the range of about 25,000 to about 45,000 psi and the temperature is in the range of about 200 to about 350° C.

Component (C) is a conventional polypropylene having a DSC melting point of at least about 130 degrees C., preferably about 130 to about 230 degrees C. It can be a homopolymer or a copolymer of propylene and ethylene, 1-butene, 1-hexene, 4-methyl-1-pentene, or 1-octene wherein the propylene is present in an amount of at least about 60 percent by weight, and can be produced using catalysts similar to those used for the preparation of polyethylene, usually those utilizing inside and outside electron donors. See, for example, U.S. Pat. No. 4,414,132 and 5,093,415. The density of the polypropylene can be in the range of 0.870 to about 0.915 gram per cubic centimeter, and is preferably in the range of 0.880 to 0.905 gram per cubic centimeter. The melt flow rate can be in the range of about 0.5 to about 20 grams per 10 minutes, and is preferably in the range of about 0.7 to about 10 grams per 10 minutes. Melt flow rate (also referred to as melt index) is determined in accordance with ASTM D-1238, Condition E, measured at 230° C., or JIS K 7210, and is reported in grams per 10 minutes. Impact polypropylenes, random copolymers of propylene, and block copolymers of propylene can also be used, if desired. See, for example, U.S. Pat. No. 4,882,380.

Component (D) a polysiloxane-polyether block copolymer having the following formula:

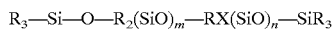

wherein each R is independently a monovalent alkyl, alkoxy, hydroxy, aryl, or aralkyl group;

X has the formula:

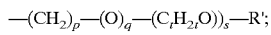

R' is the same as R above and —$(C_tH_{2t}O)_s$— is a radical group of ethylene oxide or propylene oxide polymer; and
m is 5 to 300; n is 2 to 20; p is 0 or 2; q is 0 or 1; t is 2 or 3; and s is 5 to 100.

Examples are:

(1) $(CH_3)_3SiO$—$(Si(CH_3)_2O)_{16}$—$(Si(CH_3)((CH_2)_2O(C_2H_4O)_{10}CH_3)O)_2$—$Si(CH_3)_3$ (2) $(CH_3)_3SiO$—$(Si(CH_3)_2O)_{163}$—$(Si(CH_3)((CH_2)_2O(C_2H_4O)_{17}(C_3H_6O)_8C_2H_5)O)_{13}$—$Si(CH_3)_3$ (3) $(CH_3)_3SiO$—$(Si(CH_3)(C_6H_5)O)_3$—$(Si(CH_3)_2O)_{32}(Si(CH_3)(O(C_2H_4O)_3(C_3H_6O)_7OC_2H_5)O))$—$Si(CH_3)_3$ (4) $(C_2H_5)_3SiO$—$(Si(C_2H_5)_2O)_{216}$—$(Si(C_2H_5)((CH_2)_2O(C_3H_6)_{18}OC2H5)O)$—$Si(C_2H_5)_2(OC_2H_5)$ (5) $(CH_3)_3SiO$—$(Si(CH_3)_2O)_{43}$—$(Si(CH_3)((CH_2)_2O(C_2H_4O)_8OCH_3)O)$ $(Si(CH_3)_2O)_{16}(Si(CH_3)$ $((C_2H_4O)O(C_3H_6O)_{13}OCH_3)O)$—$(Si(CH_3)_2O)_{18}Si(CH_3)_3$ (6) $(CH_3)_3SiO$—$(Si(CH_3)_2O)_{287}$—$(Si(CH_3)((CH_2)_2O(C_2H_4O)_{32}(C_3H_6O)$ $52OC2H5)O)_{16}$—$Si(CH_3)_2OCH_3$ (7) $(CH_3)_3SiO$—$(Si(CH_3)_2O)_{87}$—$(Si(CH_3)((CH_2)_2O(C_2H_4O)_{17}(C_3H_6O)_{23}CH_3)O)_8$—$Si(CH_3)_3$

Component (E) is a nucleating agent selected from the group consisting of azodicarbonamide (ADCA), talc, and mixtures thereof.

For each 100 parts by weight of component (A), the following components are present in the mixture in parts by weight:

| component | broad | preferred |
|---|---|---|
| (B) | about 20 to about 150 | about 30 to about 60 |
| (C) | about 1 to about 50 | about 1 to about 8 |
| (D) | about 0.1 to about 5 | about 0.1 to about 1 |
| (E) | about 0.02 to about 5 | about 0.1 to about 3 |

The mixture of components (A) to (E) is thoroughly mixed (or kneaded) in a conventional mixer or kneader such as a V-blender, a ribbon blender, a Henschel™ mixer, a Banbury™ mixer, a Brabender™ mixer, a Buss™ co-kneader, or a tumbler, or an extruder adapted for mixing at a temperature in the range of about 150 to about 200 degrees C. In this specification, mixing and kneading are synonymous. The expandable resin composition is then introduced into an extruder adapted for expanding (foaming or blowing) the resin composition, generally in the range of about 140 to about 230 degrees C. At about the same time, usually simultaneously with the introduction of the resin composition, an inert gas such as nitrogen is introduced into the extruder in an amount of about 0.01 to about 10 parts by weight of inert gas per 100 parts by weight of expandable resin composition. Other inert gases, which can be used are helium, neon, krypton, xenon, radon, and carbon dioxide. Nitrogen and carbon dioxide are preferred. Also, at about the same time, an electrical conductor or communications medium, or a core containing two or more of same, is introduced into the same extruder, and it is coated in the extruder with the expandable resin composition. The nitrogen serves to expand the resin composition in the extruder or thereafter in air. Water can be used as a coolant to solidify the coating on, for example, wire, glass fiber, or a core containing either. It is found that the coating expands by at least about 70 percent by volume, and often by at least about 80 percent by volume.

Various conventional additives can be added to the expandable resin composition prior to or during the mixing of the components, and prior to or during extrusion. The additives include antioxidants, ultraviolet absorbers or stabilizers, antistatic agents, pigments, dyes, nucleating agents, reinforcing fillers or polymer additives, resistivity modifiers such as carbon black, slip agents, plasticizers, processing aids, lubricants, viscosity control agents, tackifiers, anti-blocking agents, surfactants, extender oils, metal deactivators, voltage stabilizers, flame retardant fillers and additives, crosslinking boosters and catalysts, and smoke suppressants. Additives can be added in amounts ranging from less than about 0.1 to more than about 5 parts by weight for each 100 parts by weight of the resin. Fillers are generally added in larger amounts up to 200 parts by weight or more.

Examples of antioxidants are: hindered phenols such as tetrakis[methylene(3,5-di-tert-butyl-4-hydroxyhydrocinnamate)]-methane, bis[(beta-(3,5-ditert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; various amines such as polymerized 2,2,4-trimethyl-1,2-dihydroquinoline; and butylated hydroxytoluene. Antioxidants can be used in amounts of about 0.1 to about 5 parts by weight per 100 parts by weight of resin.

The expandable resin composition can be mixed and the cable coated with expanded resin can be prepared in various types of extruders, some of which are described in U.S. Pat. Nos. 4,814,135; 4,857,600; 5,076,988; and 5,153,382. All types of single screw and twin screw extruders and polymer melt pumps and extrusion processes will generally be suitable in effecting the process of this invention as long as they are adapted for mixing or foaming. An L type extruder or a single screw extruder of L/D 30:1 to 35:1 can be particularly mentioned. L/D is the ratio of length to diameter. While the expensive L type extruder can be used, it is an advantage of this invention that good dispersability can be achieved with a low cost single screw extruder at L/D 30:1 to 35:1. Other advantages of this extruder are good foaming; uniform cellular structure; good electrostatic tangent; and good electrostatic capacity. This extruder typically has a cross-head having a nipple and die, and a core electric conductor driver.

A typical extruder, commonly referred to as a fabrication extruder will have a solids feed hopper at its upstream end and a melt forming die at its downstream end. The hopper feeds unfluxed plastics into the feed section of a barrel containing the processing screw(s) that flux and ultimately pump the plastic melt through the forming die. At the downstream end, between the end of the screw and the die, there is often a screen pack and a die or breaker plate. Fabrication extruders typically accomplish the mechanisms of solids conveying and compression, plastics fluxing, melt mixing and melt pumping although some two stage configurations use a separate melt fed extruder or melt pump equipment for the melt pumping mechanism. Extruder barrels are equipped with barrel heating and cooling features for startup and improved steady state temperature control. Modern equipment usually incorporates multiple heating/cooling zones starting at the rear feed zone and segmenting the barrel and downstream shaping die. The L/D of each barrel can be in the range of about 25:1 to about 35:1.

The expanded resin composition is useful in combination with electrical conductors comprised of metal such as copper or of carbon, or with communications media such as glass or plastic filaments used, for example in fiber optics applications.

This specification is based on Japanese patent application 317477/1998 filed in Japan on Nov. 9, 1998 (applicant: Nippon Unicar Company Limited; inventors: Sakamoto et al) for which priority is claimed.

The patents and application mentioned in this specification are incorporated by reference herein.

The invention is illustrated by the following examples.

EXAMPLE 1

85 parts by weight of low density polyethylene having long chain branching prepared by a high pressure process as described above; a melting point of 106 degrees C.; a density of 0.923 gram per cubic centimeter; a swelling ratio of 60 percent; and a melt flow rate of 2.6 grams per 10 minutes; 18 parts by weight of polypropylene having a melting point of 151 degrees C.; a density of 0.90 gram per cubic centimeter; and a melt flow rate of 2.7 grams per 10 minutes; 1.8 parts by weight of a polysiloxane-polyether block copolymer of the formula (1) above; 0.8 part by weight of azodicarbonamide; 0.2 part by weight of talc; and 0.5 part by weight of an antioxidant (butylated hydroxytoluene) are mixed with 100 parts by weight of high density polyethylene having a melting point of 135 degrees C.; a density of 0.959 gram per cubic centimeter; a swelling ratio of 48 percent and a melt flow rate of 3.4 grams per 10 minutes. The mixture is kneaded using a Banbury™ mixer at 170 degrees C. for 15 minutes, and an expandable resin composition is prepared. The expandable resin composition is made in a sheet form. The sheet is cut by a sheet cutter to make pellets 3 millimeters thick, 5 millimeters long, and 4 millimeters wide.

The pellets are then fed into a hopper of a 75 millimeter die single screw extruder having an L/D of 32:1 and are heated in a cylinder (which is abbreviated as C) that encircles the outer side of the screw having the same axis, and are kneaded with the screw. The cylinder is generally comprised of 5 sections. Each section of the cylinder can be referred to as C1, C2, C3, C4, and C5 in an order from the inlet of the extruder to the exit. The temperatures of C1, C2, C3, C4, and C5 are adjusted at 160 degrees C., 180 degrees C., 190 degrees C., 198 degrees C. and 198 degrees C., respectively. 1.5 parts by weight of nitrogen gas and 0.5 part by weight of carbon dioxide gas are injected at the C3 section by pressure to 100 parts by weight of the pelletized expandable resin. The expandable resin composition, nitrogen gas, and carbon dioxide gas are kneaded to blend the composition uniformly. Then, the blend is extruded onto a copper core wire, which has a diameter of 2.4 millimeters. The extrusion is effected through a cross-head having a linear winding rate of 20 meters per minute, and a cellular insulated coaxial cable core having an outer diameter of 9.4 millimeters is obtained.

A coaxial cable obtained as above has 84.2 percent foaming and a cell diameter of 20 to 80 microns. A cylindrical test piece of the coaxial cable, 20 millimeters long, is prepared, and its compressive strength (Young's modulus of elasticity) is calculated by compression volume (strain) and force by compressing towards the diameter direction at a speed of 10 meters per minute. The result is 1.13 kilograms per square millimeter. It is found that the mechanical strength of the coaxial cable is sufficient. In addition, its static electricity (static electric capacity) is determined as 46 nF per kilometer (nF is defined as nano Farads). Thus, the electrical property is excellent.

EXAMPLE 2

85 parts by weight of low density polyethylene having long chain branching prepared by a high pressure process having a melting point of 103 degrees C.; a density of 0.921 gram per cubic centimeter; a swelling ratio of 52 percent; and a melt flow rate of 3.6 grams per 10 minutes; 25 parts by weight of polypropylene having a melting point of 154 degrees C.; a density of 0.90 gram per cubic centimeter; and a melt flow rate of 3.7 grams per 10 minutes; 0.9 part by weight of a polysiloxane/polyether block copolymer having formula (1) above; 0.7 part by weight of azodicarbonamide; 0.2 part by weight of talc; and 0 5 part by weight of an antioxidant (butylated hydroxytoluene) are mixed with 100 parts by weight of high density polyethylene having a melting point of 132 degrees C.; a density of 0.955 gram per cubic centimeter; a swelling ratio of 56 percent and a melt flow rate of 3.8 grams per 10 minutes. The mixture is kneaded in a Banbury™ mixer at a temperature of 170 degrees C. for 15 minutes, and an expandable resin composition is prepared in sheet form. The sheet is cut by a sheet cutter to make pellets 3 millimeters thick, 5 millimeters long; and 4 millimeters wide.

The pellets are then fed to a hopper of a 75 millimeter die single screw extruder having an L/D of 32:1. The temperatures of C1, C2, C3, C4, and C5 are adjusted to 160 degrees C., 180 degrees C., 190 degrees C.; 198 degrees C.; and 198 degrees C., respectively. 1.5 parts by weight of nitrogen gas and 0.5 part by weight of carbon dioxide gas are injected into the C3 section by pressure. 100 parts by weight of the pelletized expandable resin, the nitrogen gas and the carbon dioxide gas are kneaded to blend the composition uniformly. Then, the composition is extruded onto a copper core wire having a diameter of 2.4 millimeters through a cross-head at a linear winding rate of 20 meters per minute, and a cellular insulated coaxial cable core having an outer diameter of 9.4 millimeters is obtained.

A coaxial cable obtained as above has 74.7 percent foaming and a cell diameter of 30 to 100 microns. A cylindrical test piece of the coaxial cable, 20 millimeters long, is prepared, and its compressive strength (Young's modulus of elasticity) is determined by compression volume (strain) and force by compressing toward the diameter direction at a speed of 10 meters per minute. The result is 1.32 kilograms per square millimeter. It is found that the mechanical strength of the coaxial cable is sufficient. In addition, the static electricity is determined as 50 nF per kilometer. The electrical property is excellent.

Comparative Example 1

Example 1 is repeated except that the amount of low density polyethylene is changed to 230 parts by weight. It is found that Young's modulus of elasticity is 0.87 kilogram per square millimeter, and that the mechanical strength is insufficient.

Comparative Example 2

Example 1 is repeated except that the amount of low density polyethylene is changed to 15 parts by weight. It is found that a uniform cellular structure is not obtained. In addition, the foaming is 65 percent, and therefore the coaxial cable does not fulfill an object of the invention.

Comparative Example 3

Example 1 is repeated except that the amount of polypropylene is changed to 0.5 part by weight. Foaming is 66 percent, and therefore the coaxial cable does not fulfill an object of the invention.

Comparative Example 4

Example 1 is repeated except the amount of polypropylene is changed to 62 parts by weight. The cellular structure is found to be uneven, and the electrical property of the coaxial cable is insufficient.

Comparative Example 5

Example 1 is repeated except that the amount of polysiloxane-polyether block copolymer is changed to 0.04 part by weight. The cellular structure is found to be uneven, and the electrical property of the coaxial cable is insufficient.

Comparative Example 6

Example 1 is repeated except that the amount of polysiloxane-polyether block copolymer is changed to 6.5 parts by weight. It is found that the dielectric constant is elevated and the electrical property has deteriorated.

Comparative Example 7

Example 1 is repeated except that the amount of azodicarbonamide (ADCA) and talc is changed to 0.01 part by weight of ADCA alone. Foaming is 65 percent, and therefore the coaxial cable does not fulfill an object of the invention.

Comparative Example 8

Example 1 is repeated except that the amount of azodicarbonamide is changed to 10 parts by weight. The foaming phenomenon is observed to lead to fluctuation of the outer diameter, and the electrical property has deteriorated.

Comparative Example 9

The expandable resin composition prepared in Example 1 is processed by inert gas foaming similar to Example 1 by using a 50 millimeter die single screw extruder having an L/D of 28:1. The cylinder temperature at the feed zone is adjusted to 143 degrees C.; the cylinder temperature at the compression zone to 163 degrees C.; and the cylinder temperature at the metering zone to 175 degrees C. 1.9 parts by weight of nitrogen gas is injected under pressure into 100 parts by weight of the expandable resin composition in the feed zone to disperse the nitrogen. Then, the expandable resin composition is extruded onto a copper core wire having a diameter of 2.4 millimeters through a cross-head at a linear winding rate of 25 meters per minute, and a cellular insulated coaxial cable core having an outer diameter of 9.4 millimeters is obtained.

The coaxial cable obtained as above has a foaming of 63 percent. Its cellular structure is not only uneven, but also its static electricity is 58 nF per kilometer. Thus, it does not fulfill coaxial cable standards.

What is claimed is:

1. An expandable resin composition comprising
    (A) 100 parts by weight of HDPE (high density polyethylene) having a DSC melting point of about 130 to about 136 degrees C.; a density of 0.945 to 0.968 gram per cubic centimeter; and a melt flow rate of about 0.1 to about 25 grams per 10 minutes, and for each 100 parts by weight of component (A),
    (B) about 20 to about 150 parts by weight of a high pressure, low density homopolymer of ethylene (HP-LDPE) having long chain branching; a density of 0.915 to 0.925 gram per cubic centimeter; and a melt flow rate of 0.1 to 10 grams per 10 minutes;
    (C) about 1 to about 50 parts by weight of polypropylene having a DSC melting point of at least about 130 degrees C.;
    (D) about 0.1 to about 5 parts by weight of a polysiloxane-polyether block copolymer having the following formula:

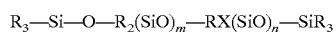

wherein each R is independently a monovalent alkyl, alkoxy, hydroxy, aryl, or aralkyl group;

X has the formula: $-(CH_2)_p-(O)_q-(C_tH_{2t}O)_s-R'$;
R' is the same as R above and $-(C_tH_{2t}O)_s-$ is a radical group of ethylene oxide or propylene oxide polymer; and m is 5 to 300; n is 2 to 20; p is 0 or 2; q is 0 or 1; t is 2 or 3; and s is 5 to 100; and (E) about 0.02 to about 5 parts by weight of a nucleating agent selected from the group consisting of azodicarbonamide, talc, and mixtures thereof.

2. An expandable resin composition comprising:

(A) 100 parts by weight of HDPE (high density polyethylene) having a DSC melting point of about 130 to about 136 degrees C.; a density of 0.945 to 0.968 gram per cubic centimeter; and a melt flow rate of about 0.1 to about 10 grams per 10 minutes, and for each 100 parts by weight of component (A), (B) about 30 to about 60 parts by weight of a high pressure, low density homopolymer of ethylene (HP-LDPE) having long chain branching; a density of 0.915 to 0.925 gram per cubic centimeter; and a melt flow rate of 0.1 to 10 grams per 10 minutes;

(C) about 1 to about 8 parts by weight of polypropylene having a DSC melting point in the range of about 130 to about 230 degrees C.;

(D) about 0.1 to about 1 part by weight of a polysiloxane-polyether block copolymer having the following formula:

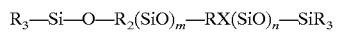

wherein each R is independently a monovalent alkyl, alkoxy, hydroxy, aryl, or aralkyl group;

X has the formula:

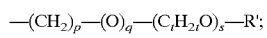

R' is the same as R above and $-(C_tH_{2t}O)_s-$ is a radical group of ethylene oxide or propylene oxide polymer; and m is 5 to 300; n is 2 to 20; p is 0 or 2; q is 0 or 1; t is 2 or 3; and s is 5 to 100; and (E) about 0.1 to about 3 parts by weight of a nucleating agent selected from the group consisting of azodicarbonamide, talc, and mixtures thereof.

3. A cable comprising one or more electrical conductors or communications media, or a core of two or more electrical conductors or communications media, each electrical conductor, communications medium, or core being surrounded by an expandable or expanded resin composition comprising:

(A) 100 parts by weight of HDPE (high density polyethylene) having a DSC melting point of about 130 to about 136 degrees C.; a density of 0.945 to 0.968 gram per cubic centimeter; and a melt flow rate of about 0.1 to about 25 grams per 10 minutes, and for each 100 parts by weight of component (A), (B) about 20 to about 150 parts by weight of a high pressure, low density homopolymer of ethylene (HP-LDPE) having long chain branching; a density of 0.915 to 0.925 gram per cubic centimeter; and a melt flow rate of 0.1 to 10 grams per 10 minutes;

(C) about 1 to about 50 parts by weight of polypropylene having a DSC melting point of at least about 130 degrees C.;

(D) about 0.1 to about 5 parts by weight of a polysiloxane-polyether block copolymer having the following formula:

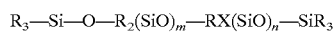

wherein each R is independently a monovalent alkyl, alkoxy, hydroxy, aryl, or aralkyl group;

X has the formula: $-(CH_2)_p-(O)_q-(C_tH_{2t}O)_s-R'$;

R' is the same as R above and $-(C_tH_{2t}O)_s-$ is a radical group of ethylene oxide or propylene oxide polymer; and m is 5 to 300; n is 2 to 20; p is 0 or 2; q is 0 or 1; t is 2 or 3; and s is 5 to 100; and (E) about 0.02 to about 5 parts by weight of a nucleating agent selected from the group consisting of azodicarbonamide, talc, and mixtures thereof.

4. The cable defined in claim 3 wherein the cable is a coaxial cable.

* * * * *